(12) United States Patent  
Lev et al.

(10) Patent No.: US 7,531,764 B1
(45) Date of Patent: May 12, 2009

(54) KEYBOARD ILLUMINATION SYSTEM

(75) Inventors: Jeffrey A. Lev, Tomball, TX (US); Jonathan R. Harris, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/011,363

(22) Filed: Jan. 25, 2008
(Under 37 CFR 1.47)

(51) Int. Cl.
*H01H 13/83* (2006.01)

(52) U.S. Cl. .................... 200/310; 200/314; 200/317

(58) Field of Classification Search ......... 200/310–316; 341/22, 23, 28; 345/156, 168, 170–172; 361/680; 362/84, 85
See application file for complete search history.

(56) References Cited

U.S. PATENT DOCUMENTS

| | | | |
|---|---|---|---|
| 4,078,257 A | 3/1978 | Bagley | |
| 4,280,121 A | 7/1981 | Crask | |
| 4,812,831 A | 3/1989 | Laier | |
| 4,844,637 A | 7/1989 | Buisson et al. | |
| 5,164,723 A | 11/1992 | Nebenzahl | |
| 5,777,603 A | 7/1998 | Jaeger | |
| 5,818,361 A | 10/1998 | Acevedo | |
| 5,899,553 A | 5/1999 | Howell | |
| 5,950,809 A * | 9/1999 | Andre | 200/314 |
| 6,036,326 A | 3/2000 | Yoshikawa et al. | |
| 6,168,283 B1 | 1/2001 | Howell | |
| 6,275,217 B1 | 8/2001 | Jaeger | |
| 6,441,806 B1 | 8/2002 | Jaeger | |
| 6,608,271 B2 * | 8/2003 | Duarte | 200/311 |
| 6,761,462 B2 * | 7/2004 | Yoshida | 362/109 |
| 6,834,975 B2 * | 12/2004 | Chu-Chia et al. | 362/84 |
| 6,917,005 B2 * | 7/2005 | Sasaki | 200/314 |
| 7,027,037 B2 | 4/2006 | Dowd | |
| 7,073,916 B2 * | 7/2006 | Yin et al. | 362/84 |
| 7,090,368 B2 * | 8/2006 | Oross et al. | 362/84 |
| 7,154,428 B2 | 12/2006 | de Clercq et al. | |
| 7,187,306 B2 * | 3/2007 | Makino et al. | 341/21 |
| 7,329,018 B2 * | 2/2008 | Yu et al. | 362/84 |
| 7,335,844 B2 * | 2/2008 | Lee et al. | 200/310 |
| 7,369,064 B2 * | 5/2008 | Yeh | 341/22 |
| 2005/0073446 A1 | 4/2005 | Lazaridis et al. | |
| 2006/0101349 A1 | 5/2006 | Lieberman et al. | |

* cited by examiner

Primary Examiner—Michael A Friedhofer

(57) ABSTRACT

A keyboard illumination system comprises an electronic device having a keyboard with at least one keycap, the at least one keycap having disposed thereon at least two different legends, at least one of the two different legends visible in response to being illuminated with an ultraviolet (UV) light source, the electronic device configured to register input of the at least one legend while the UV light source is activated.

19 Claims, 3 Drawing Sheets

KEYBOARD ILLUMINATION SYSTEM

BACKGROUND

Keyboards are typically configured for a single language. In some instances, the same keyboard can be used for multiple languages by having one key represent different letters, characters, and/or symbols in another language. However, if different legends are placed on the keycaps of the keyboard to accommodate different languages or other such uses, the keycaps become overcrowded and difficult to distinguish the different legends.

BRIEF DESCRIPTION OF THE DRAWINGS

For a more complete understanding of the present disclosure, and the objects and advantages thereof, reference is now made to the following descriptions taken in connection with the accompanying drawings in which.

DETAILED DESCRIPTION OF THE DRAWINGS

Figure 1:
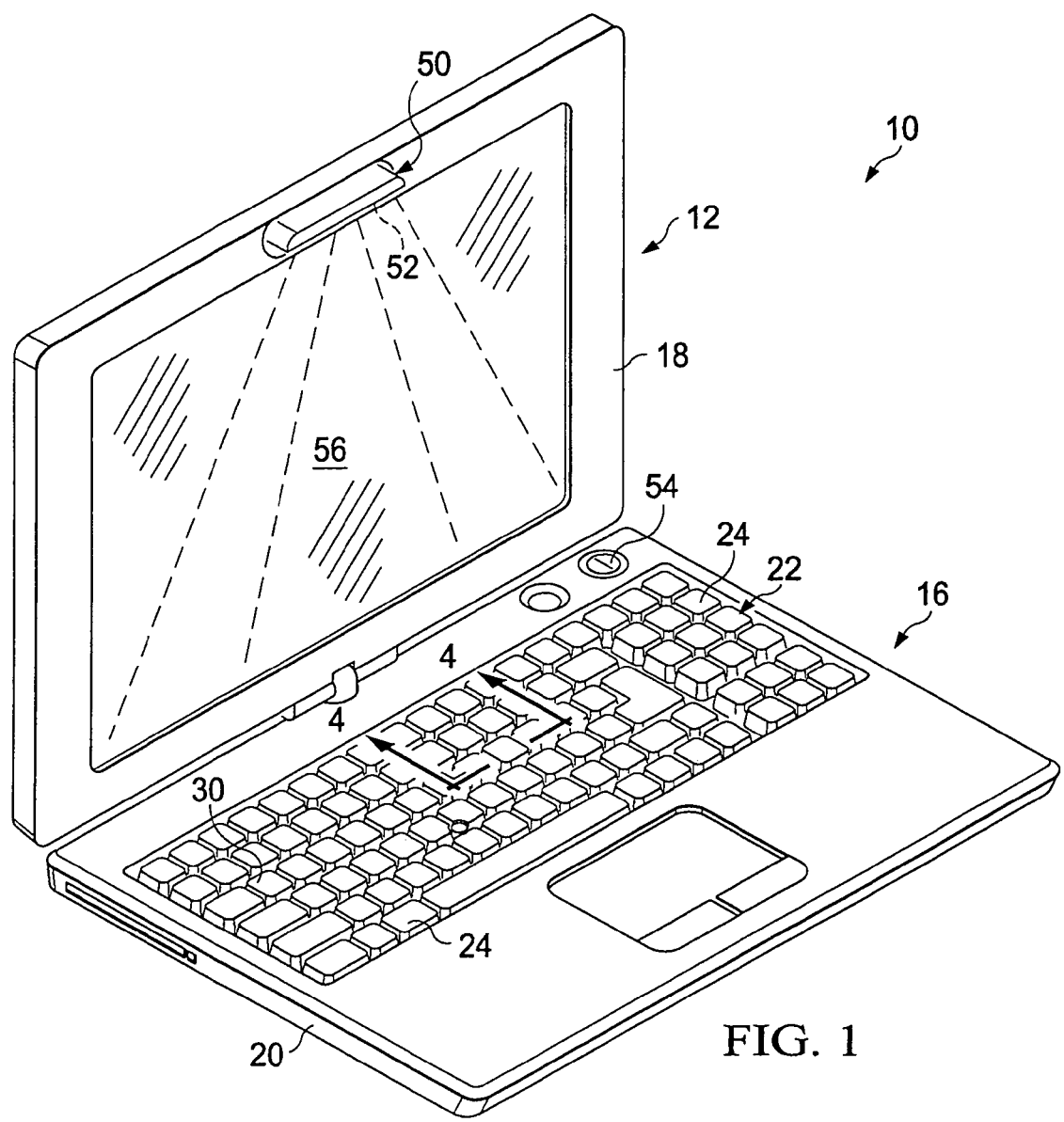
FIG. 1 is a diagram illustrating an electronic device in which an embodiment of a keyboard illumination system is used to advantage.
Figure 2A:
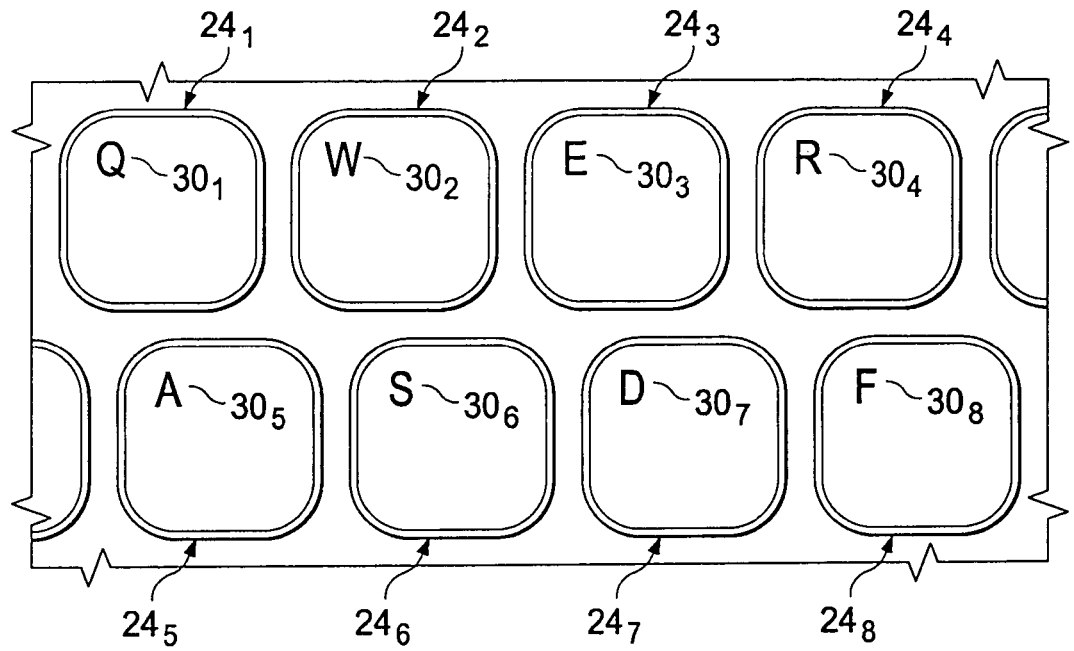
FIGS. 2A and 2B are diagrams illustrating an enlarged view of a portion of a keyboard of the system of FIG. 1 in two different states of illumination.
Figure 2B:
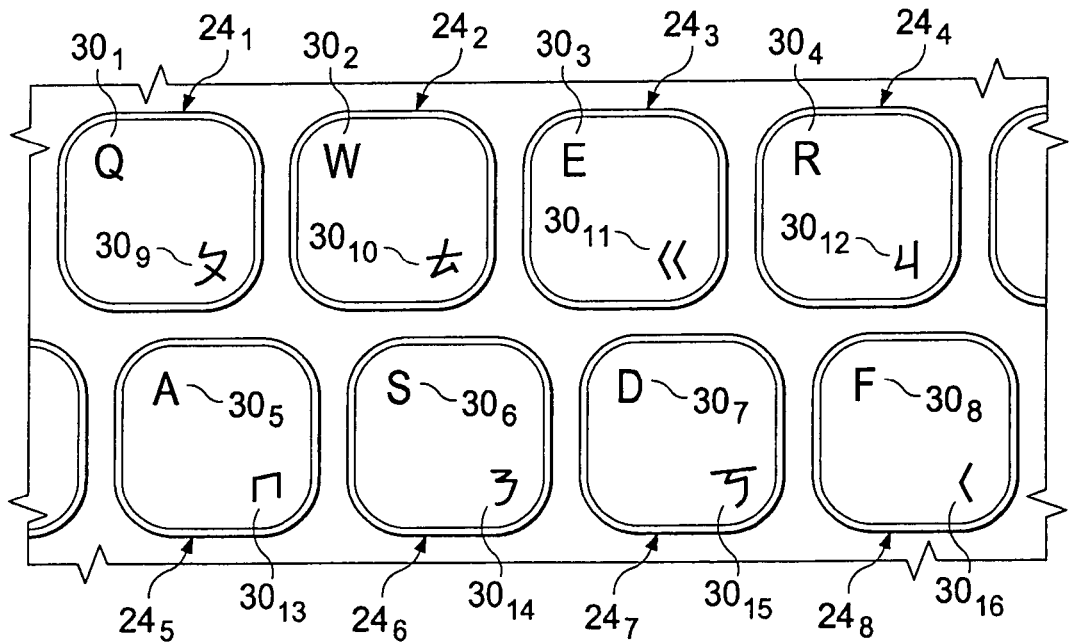

Various embodiments of the present disclosure and the advantages thereof are best understood by referring to FIGS. 1-4 of the drawings, like numerals being used for like and corresponding parts of the various drawings FIG. 1 is a diagram illustrating an electronic device 10 in which an embodiment of a keyboard illumination system 12 is used to advantage, and FIGS. 2A and 2B are diagrams illustrating an enlarged view of a portion of a keyboard 22 of system 12 of FIG. 1 in two different states of illumination. In FIGS. 1 and 2, electronic device 10 comprises a portable laptop or notebook computer 16 having a display member 18 rotatably coupled to a base member 20. However, it should be understood that electronic device 10 may comprise other types of devices such as, but not limited to, a tablet computer, personal digital assistant, handheld gaming device, desktop computer, cellular phone or other type of portable or non-portable device. In FIG. 1, electronic device 10 comprises an integral keyboard 22 disposed in base member 20 (i.e., assembled and/or manufactured to be an integral component of electronic device 10). However, it should be understood that keyboard 22 may comprise a stand-alone device (e.g., a discrete and/or separate physical unit coupled to an electronic device via a wired and/or wireless connection). It should be understood that a "keyboard" shall mean a keyboard, keypad or any other collection of input elements generally having character and/or legend designations such as the alphabet, numbers, symbols, etc., used for inputting information to electronic device 10 via contact therewith. In the embodiment illustrated in FIGS. 1 and 2, keyboard 22 comprises one or more keycaps 24 for receiving user input therewith. Keycap(s) 24 comprises legends 30 such as a character designation and/or key recognition element. Legend(s) 30 may be applied to keycap(s) 24 by applying a coating to keycap(s) 24, molding the particular legend(s) 30 into the particular keycap 24, having the legend(s) 30 screened onto an upper surface of keycap(s) 24, or otherwise.

In the embodiment illustrated in FIG. 1, electronic device 10 comprises at least one light ultraviolet (UV) light source 50 configured to emit non-harmful and/or low levels of ultraviolet light toward keyboard 22 and corresponding keycap(s) 24. For example, in some embodiments, light source 50 comprises an ultraviolet light emitting diode (UVLED) 52. However, it should be understood that other sources of UV light may be used. Further, it should be understood that another type of light source may be provided on electronic device 10 (e.g., a light source for directing white light at keyboard 22 to facilitate viewing of keyboard 22 in low light conditions). In the embodiment illustrated in FIG. 1, electronic device 10 comprises a switch 54 operatively coupled to light source 50 that is actuatable by a user to turn light source on/off. Switch 54 may comprise a button, slideable member, touchpad or other type of element physically manipulatable by a user to effectuate activation and de-activation of light source 50. It should also be understood that light source 50 may be activated/de-activated using other methods (e.g., by clicking on a software-based icon displayed on a display screen 56 of electronic device, automatic activation/de-activation by manipulating light source 50 between extended/retracted positions relative to display member 18, etc.).

In the embodiment illustrated in FIGS. 1 and 2, system 12 is configured such that at least one keycap 24 has at least two different legends 30 disposed thereon such that one of the legends 30 on a particular keycap 24 is visible in white light while another, different legend 30 on the subject keycap 24 is invisible in white light but visible in response to being exposed to UV light from UV light source 50. For example, referring to FIGS. 2A and 2B, eight keycaps $24_1$-$24_8$ of keyboard 22 are illustrated. FIG. 2A illustrates keycaps $24_1$-$24_8$ when exposed to white light, and FIG. 2B illustrates keycaps $24_1$-$24_8$ when exposed to UV light from light source 50. Referring to FIG. 2B, each of keycaps $24_1$-$24_8$ have two different legends 30 disposed thereon. For example, keycaps $24_1$-$24_8$ have legends $30_1$-$30_8$ representing English alphabet character designations, respectively. Keycaps also have legends $30_9$-$30_{16}$ representing Chinese alphabet character designations, respectively. It should be understood that the different and/or alternate legends 30 disposed on keycap(s) 24 are not limited to lingual characters.

In FIGS. 2A and 2B, legends $30_1$-$30_8$ are formed to be visible in white light, and legends $30_9$-$30_{16}$ are formed to be invisible (or substantially invisible) in white light but visible in response to being exposed to UV light (e.g., from light source 50). For example, legends $30_9$-$30_{16}$ may be formed using a colorant disposed on and/or in keycaps 24 that emits light in a visible spectrum in response to being exposed to and/or absorbing light in a non-visible spectrum, such as UV light. The colorant used for legends $30_9$-$30_{16}$ may comprise any type of pigment, dye, paint, coating, etc., configured to emit light in a visible spectrum in response to being exposed to and/or absorbing UV light. For example, in some embodiments, the colorant used for legends $30_9$-$30_{18}$ may comprises a fluorescent and/or luminous material component capable of absorbing light in a non-visible spectrum and emitting light in a visible spectrum (even after an excitation source, such as a light source 50, has been turned off). It should be understood that keycap(s) 24 may be otherwise configured. For example, in some embodiments, a portion of keycaps $24_1$-$24_8$ surrounding particular legends $30_9$-$30_{16}$ may be formed with and/or otherwise contain a colorant that emits light in a visible spectrum in response to being exposed to and/or absorbing UV light 40 such that the portion of keycaps $24_1$-$24_8$ surrounding a particular legend $30_9$-$30_{16}$ may emit the light in the visible spectrum, thereby resulting in a lighted outline surrounding a non-illuminated legend $30_9$-$30_{16}$. The colorant used to form legends $30_9$-$30_{16}$ may be applied onto the upper and/or contacted surfaces of keycap(s) 24, molded into keycap(s) 24 and/or otherwise incorporated into keycap(s) 24 to facilitate a visible indication of keycap(s) 24 (e.g., a visible indication of legends $30_9$-$30_{16}$). It should be understood that the visibility of legends $30_9$-$30_{16}$ is not limited to low light conditions. For example, in some embodiments, UV light source 50 is activatable during normal light conditions (e.g., in a well lit room, outdoors during daytime hours, etc.), thereby enabling legends $30_1$-$30_8$ and legends $30_9$-$30_{16}$ to be visible. Thus, for example, FIG. 2A illustrates keycaps $24_1$-$24_8$ when exposed to white light while light source 50 is off (e.g., during normal light conditions), and FIG. 2B illustrates keycaps $24_1$-$24_8$ when exposed to UV light from light source 50 (e.g., in the same light conditions but with light source 50 on).

Referring to FIG. 1, light source 50 is illustrated as being disposed in display member 18 such that light source 50 is positioned to facilitate directing UV light in a direction toward keyboard 22 and keycap(s) 24. However, it should also be understood that light source 50 may be configured to be attachable or couplable to electronic device 10 (e.g., via a universal serial bus (USB) port or otherwise) such that light source 50 comprises a separate and/or discrete component. Further, it should be understood that light source 50 may be configured to remain in a stationary position or may be configured to be directionally adjustable to facilitate manipulation thereof by a user for directing energy toward keyboard 22. It should also be understood that light source 50 may be otherwise disposed on electronic device 10 (e.g., located on base member 20 and/or at multiple locations on base member 20 and/or display member 18)

Figure 3:
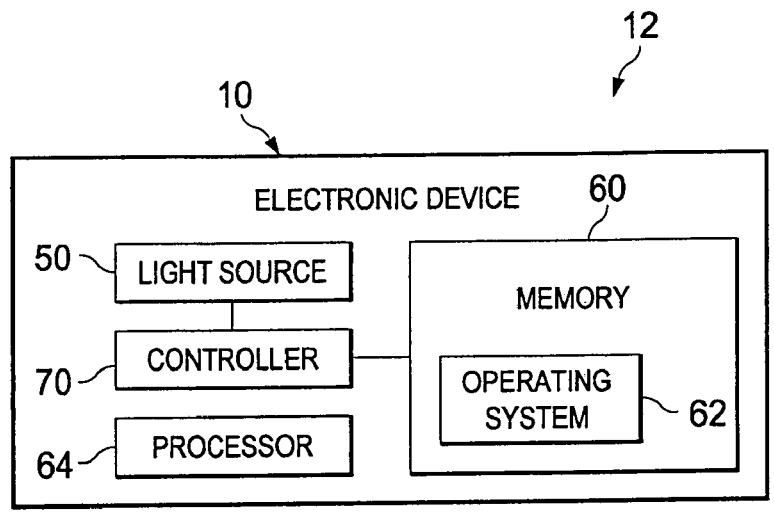
FIG. 3 is a block diagram illustrating the electronic device and keyboard illumination system of FIGS. 1, 2A and 2B.

FIG. 3 is a block diagram illustrating an embodiment electronic device 10 keyboard illumination system 12 of FIGS. 1, 2A and 2B. In the embodiment illustrated in FIG. 3, system 12 comprises a memory 60 having an operating system 62 stored therein that is executable by a processor 64 for controlling various operations/applications associated with electronic device. For example, operating system 62 may be used to interface with various software applications residing on, accessible by and/or executable by processor 64 of electronic device 10 (e.g., a web browser, a word processing application, etc.). In the embodiment illustrated in FIG. 3, system 12 also comprises a controller 70 operatively coupled to light source 50 and also operatively coupled to operating system 62. Controller 70 may comprise hardware, firmware, software, or any combination thereof, and may also have processing capabilities, such as a keyboard controller. Controller 70 is configured to detect and/or cause activation/de-activation of light source 50 and, depending on the active/inactive state of light source 50, interface and/or otherwise cooperate with operating system 62 such that operating system 62 registers a particular legend 30 as an input based on keystroke inputs associated with keyboard 22. For example, in some embodiments, if UV light source 50 is active (thereby causing legends $30_9$-$30_{16}$ to be visible to a user (FIG. 2B)), controller 70 interfaces and/or otherwise cooperates with operating system 62 such that operating system 62 registers legends $30_9$-$30_{16}$ as input in response to keystroke inputs received by corresponding keycaps $24_1$-$24_8$. Further, in some embodiments, if UV light source 50 is inactive (thereby resulting in legends $30_9$-$30_{16}$ being invisible or substantially imperceptible to a user (FIG. 2A)), controller 70 interfaces and/or otherwise cooperates with operating system 62 such that operating system 62 registers legends $30_1$-$30_8$ as input in response to keystroke inputs received by corresponding keycaps $24_1$-$24_8$. It should be understood that electronic device 10 may by otherwise configured such that operating system 62 or another system associated with electronic device 10 distinguishes between legends $30_1$-$30_8$ and legends $30_9$-$30_{16}$ and registers the desired keystoke input when light source 50 is activated and/or legends $30_9$-$30_{16}$ are visible.

Figure 4:
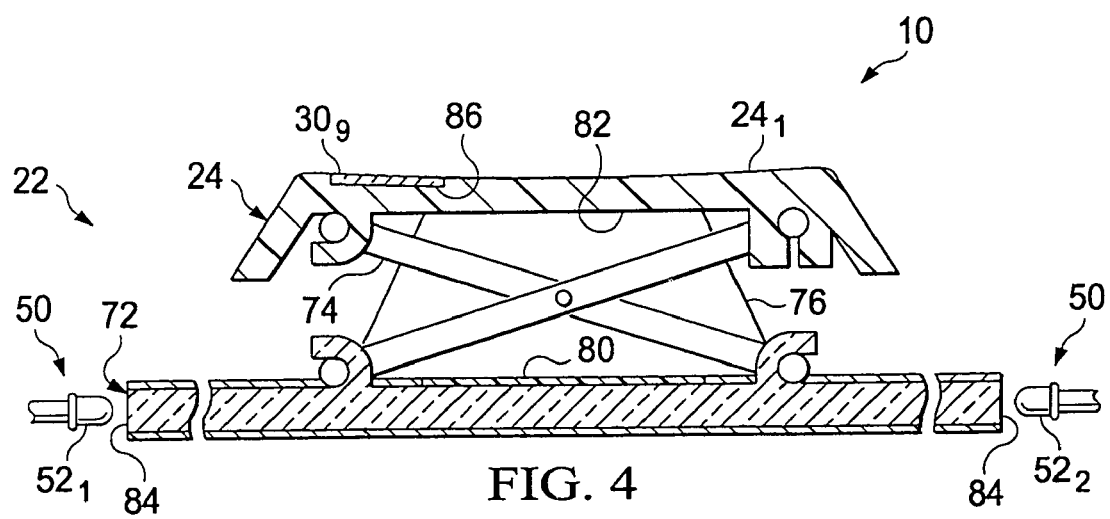
FIG. 4 is a diagram illustrating another embodiment of a keyboard a keyboard illumination system.

It should also be understood that light source 50 may be disposed near or beneath keyboard 22 such that UV light is directed upwardly from below keyboard 22 toward keycaps 24. For example, FIG. 4 is a diagram illustrating a section view of an embodiment of keyboard 22 of FIG. 1 taken along the line 4-4 of FIG. 1. In the embodiment illustrated in FIG. 4, keyboard 22 comprises keycap(s) 24 for receiving user input therewith and a lightpipe base plate 72 for providing backlighting to keycap(s) 24. For example, in some embodiments, lightpipe base plate 72 is manufactured and/or otherwise formed from glass, plastic or another suitable optically transmissive material to facilitate light transfer therethrough. The embodiment illustrated in FIG. 4 shows keycap(s) 24 moveably coupled to lightpipe base plate 72 by a plunger or scissor mechanism 74 and a spring mechanism 76 (e.g., a rubber dome or other flexibly resilient material) to bias keycap(s) 24 away from lightpipe base plate 72 while facilitating depression of keycap(s) 24 toward lightpipe base plate 72 such that spring mechanism 76 contacts and/or otherwise engages a circuit pad 80 to register actuation of a particular keycap 24. However, it should be understood that other methods and/or devices may be used to facilitate movement and/or actuation of keycap(s) 24 for receiving user input thereof.

In the embodiments illustrated in FIG. 4, at least one UV light source 50 is disposed at a peripheral location of lightpipe base plate 72 for providing UV light to lightpipe base plate 72 to facilitate transfer of such UV light by lightpipe base plate 72 toward an underside 82 of keycap(s) 24. For example, in the embodiment illustrated in FIG. 4, light source 50 comprises UVLEDs $52_1$ and $52_2$ disposed at and/or near an edge 84 of lightpipe base plate 72 for directing light toward and/or into lightpipe base plate 74. However, it should be understood that light sources 50 may be otherwise located relative to lightpipe base plate 72.

Thus, in operation, light source(s) 50 emits UV light toward and/or into lightpipe base plate 72. Lightpipe base plate 72 receives the light from UV light source(s) 50 and transmits and/or otherwise directs the light upwardly toward underside 82 of keycap(s) 24. In FIG. 4, and for ease of illustration and description, keycap $24_1$ is illustrated as a representative example. In the embodiment illustrated in FIG. 4, keycap $24_1$ is configured having a translucent and/or otherwise light-transmissive portion 86 corresponding to legend $30_9$ such that light received from lightpipe base plate 72 illuminates such portion 86. However, it should be understood that keycap(s) 24 may be otherwise configured.

Thus, embodiments of system 12 enable an alternate and/or different set of legends 30 placed on keycaps 24 to be visible when such legends 30 are illuminated with UV light. Further, in some embodiments, in response to activation of a UV light source to enable visibility of the alternate and/or different set of legends 30, electronic device 10 automatically registers the alternate and/or different set of legends 30 as the indicated keystroke input.

What is claimed is:

1. A keyboard illumination system, comprising:
   an electronic device having a keyboard with at least one keycap, the at least one keycap having disposed thereon at least two different legends, at least one of the two different legends visible in response to being illuminated with an ultraviolet (UV) light source, the electronic device configured to register input of the at least one legend while the UV light source is activated, wherein the UV light source is removable from the electronic device and directionally adjustable by a user for directing energy toward the keyboard.

2. The system of claim 1, wherein the at least one legend is imprinted on the at least one keycap using a fluorescent colorant.

3. The system of claim 1, wherein the at least one legend is imprinted on the at least one keycap using a luminous colorant.

4. The system of claim 1, wherein the at least one legend is formed on the at least one keycap to be invisible under white light.

5. The system of claim 1, wherein the electronic device comprises a notebook computer, and wherein the UV light source is disposed in a display member of the notebook computer.

6. The system of claim 1, wherein UV light from the UV light source is directed toward an underside of the at least one keycap.

7. The system of claim 1, wherein the electronic device comprises a notebook computer.

8. The system of claim 1, wherein the UV light source comprises at least one light emitting diode (LED).

9. A method for manufacturing keyboard illumination system, comprising:
providing an electronic device having a keyboard, the keyboard having at least one keycap with at least two different legends disposed thereon, at least one of the two different legends visible in response to being illuminated with an ultraviolet (UV) light source; and
configuring the electronic device to register input of the at least one legend while the UV light source is activated, wherein the UV light source is removable from the electronic device and directionally adjustable by a user for directing energy toward the keyboard.

10. The method of claim 9, further comprising imprinting the at least one legend on the at least one keycap using a fluorescent colorant.

11. The method of claim 9, further comprising imprinting the at least one legend on the at least one keycap using a luminous colorant.

12. The method of claim 9, further comprising forming the at least one legend on the at least one keycap to be invisible under white light.

13. The method of claim 9, further comprising:
disposing the keyboard in a notebook computer; and
disposing the UV light source in a display member of the notebook computer.

14. The method of claim 9, further comprising directing UV light from the UV light source toward an underside of the at least one keycap.

15. The method of claim 9, further comprising configuring the UV light source as at least one light emitting diode (LED).

16. A keyboard, comprising:
a plurality of keycaps, at least one of the plurality of keycaps comprising a first legend and a second legend where the second legend is different from the first legend, wherein the first legend is visible in white light, and wherein the second legend is invisible in white light and visible in ultraviolet (UV) light; and
a lightpipe base plate formed of optically transmissive material to facilitate light transmission therethrough, the lightpipe base plate receives the UV light from plural light sources and directs the UV light upwardly toward an underside of the plurality of keycaps to illuminate light-transmissive portions corresponding to second legends on the plurality of keycaps.

17. The keyboard of claim 16, wherein the second legend is imprinted on the at least one keycap using a fluorescent colorant.

18. The keyboard of claim 16, wherein the second legend is imprinted on the at least one keycap using a luminous colorant.

19. The keyboard of claim 16, wherein the keycap is formed to enable the UV light to be directed toward an underside of the at least one keycap to illuminate the second legend.

* * * * *

UNITED STATES PATENT AND TRADEMARK OFFICE
CERTIFICATE OF CORRECTION

PATENT NO. : 7,531,764 B1
APPLICATION NO. : 12/011363
DATED : May 12, 2009
INVENTOR(S) : Jeffrey A. Lev et al.

It is certified that error appears in the above-identified patent and that said Letters Patent is hereby corrected as shown below:

In column 2, line 55, delete "$30_{18}$" and insert -- $30_{16}$ --, therefor.

Signed and Sealed this

Third Day of November, 2009

David J. Kappos
*Director of the United States Patent and Trademark Office*